US005336428A

United States Patent [19]

Kaplan et al.

[11] Patent Number: 5,336,428

[45] Date of Patent: Aug. 9, 1994

[54] OFFSHORE RIG CLEANER

[75] Inventors: Roy I. Kaplan, Missouri City; Jerry E. Pardue, Sugar Land, both of Tex.

[73] Assignee: Nalco Chemical Company, Naperville, Ill.

[21] Appl. No.: 468,846

[22] Filed: Jan. 23, 1990

[51] Int. Cl.[5] .......................... C11D 7/22; C02F 5/10

[52] U.S. Cl. .......................... 252/162; 252/174.21; 252/173; 252/DIG. 14; 252/80

[58] Field of Search .................. 252/162, 171, 174.21, 252/80, DIG. 14, 173

[56] References Cited

U.S. PATENT DOCUMENTS 4,414,128 11/1983 Goffinet .......................... 252/171
4,511,488 4/1985 Matta .......................... 252/162
4,533,487 8/1985 Jones .......................... 252/173

FOREIGN PATENT DOCUMENTS 61-14296 1/1986 Japan .

OTHER PUBLICATIONS

Abstract to FR 2,564,105 Nov. 15, 1985.
McCutcheon's Functional Materials, New Jersey, Manufacturing Confectioner Publishing, 1983, p. 224.

*Primary Examiner*—Prince Willis, Jr.
*Assistant Examiner*—J. Silbermann
*Attorney, Agent, or Firm*—Arnold, White & Durkee

[57] ABSTRACT

An offshore platform rig cleaner consisting essentially of as major components d-limonene (5-7% actives by weight), a non-ionic surfactant selected from one member of the group consisting of ethoxylated octyl and nonyl phenol (15-21% actives), and an acrylic copolymer thickener (0.2 to 0.4%). The thickener may be preferably ethyl acrylate-methyacrylic acid. It has also been found that in the preparation of the cleaner the order of addition should be water then surfactant then d-limonene to avoid haze in the composition and to facilitate manufacture.

9 Claims, No Drawings

OFFSHORE RIG CLEANER

This invention is devoted to an offshore platform cleaner for offshore rigs. Where the oil industry removes oil from underneath the Gulf or ocean some necessary criteria for such a platform cleaner dictate that it contain a good solvent for hydrocarbon and grease solubilization, a surfactant for degreasing and coupling the solvent into a water system, a thickening agent to allow the product to cling to vertical surfaces, and a dye for esthetic reasons.

PRIOR ART

U.S. Pat. No. 4,336,152 Like, et al. (American Cyanamid Company)—a disinfectant cleaner including a non-ionic surfactant, d-limonene, a phosphate building, and a quaternary ammonium compound and optionally a lower aliphatic alcohol. The surplusage of components here renders this reference of limited applicability.

U.S. Pat. No. 4,362,638 Caskey, et al. (S. C. Johnson & Son)—uses 8 moles of ethylene oxide reacted with nonyl phenol, d-limonene, butoxy propanol, and water. Utilization of this reference would apply a shotgun disclosure which is not close to applicant's invention.

The differences between the prior art cited and the present invention are clearly shown in the composition below, known as Composition A.

| Component Description | Weight Percent |
|---|---|
| Soft Water | 78.716 |
| 9-10 Mole Ethoxylated Nonyl Phenol | 15.000 |
| d-Limonene | 5.000 |
| Acid Blue 9 Dye | 0.004 |
| Ethyl acrylate methacrylic acid | 1.000 |
| 50% Sodium Hydroxide | 0.180 |
| 12M Hydrochloric Acid | 0.100 |

The solvent selections turn to terpenes which are a class of organic solvents derived from woody plants or citrus fruits. They are known to possess good solvency characteristics without having the adverse environmental and safety concerns often associated with many solvents derived from petrochemical sources. Mammalian toxicity is relatively low and many terpenes are listed on the Federal Food and Drug Administration's GRAS ( generally regarded as safe) list as food additives and flavorings.

In Table 1 are terpenes examined for use in Composition A.

TABLE 1

| Terpene | Manufacturer |
|---|---|
| TABS-C* | Union Camp |
| TABS-D* | Union Camp |
| Acintine LS-160A* | Arizona Chemical Company |
| Acintine LS-160B* | Arizona Chemical Company |
| Acintine LS-160D* | Arizona Chemical Company |
| Acintine LS-165D* | Arizona Chemical Company |
| d-Limonene (untreated grade) | Florida Chemical Company |
| d-Limonene (lemon-lime grade) | Florida Chemical Company |
| d-Limonene ("0" grade) | Florida Chemical Company |

*Naturally occurring from pine trees

All the terpenes in Table 1 would be adequate. d-Limonene was selected.

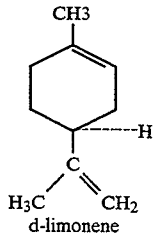

d-limonene d-Limonene had the solvency power, pleasant citrus odor, and comparatively low price required for incorporation into the Composition A solvent. It is produced commercially by expression of citrus (mainly orange, lemon, and grapefruit) peel and pulp. In the final component description, d-limonene was utilized in 5-7% by weight.

SURFACTANT SELECTION

The selection of the proper surfactant for Composition A posed some difficulties due to clouding at different temperatures caused by the presence of d-limonene. It was early found that a ratio of 3:1 surfactant to d-limonene was found to be necessary to give clear solutions over the entire temperature range from freezing to the cloud point. The 5-7% range for d-limonene thus required at least 15-21% of the surfactant, chosen to be a non-ionic surfactant. The best and most satisfactory surfactant was 9-10 mole % ethoxylated nonylphenol, which is available from various sources such as Triton N-101 (Rohm & Haas), Surfonic 95 (Texaco), and L-237M (Nalco Chemical). Also, the comparative 8-10 mole ethoxylated octylphenol is a surfactant of choice. Since we earlier decided to use a 5% d-limonene in a composition according to this invention, 15% of the surfactant was needed as the coupling agent.

Table 2 shows the proper ratio of Triton N-101 to d-limonene in Composition A.

TABLE 2

| Proper Ratio of Triton N-101 to d-Limonene in Composition A | |
|---|---|
| Ratio of Triton N-101 to d-Limonene | Appearance on Cooling to 34° F. |
| 1.0:1 | Cloudy |
| 2.0:1 | Cloudy |
| 2.4:1 | Cloudy |
| 2.8:1 | Hazy |
| 3.0:1 | Clear |
| 3.2:1 | Clear |
| 3.6:1 | Clear |

THICKENER SELECTION

One of the attributes of any general purpose cleaner used for rig degreasing is enhanced viscosity. This property allows a cleaner to cling to vertical surfaces for longer time periods. Viscosity is also associated with increased activity by many customers.

Some testing work was done to evaluate powdered thickeners such as Aqualon's CMC. 7MT, a carboxymethyl cellulose. Although the CMC thickened nicely, it was difficult to disperse and dissolve. A convenient liquid thickener that gave good enhanced viscosity was Rohm & Haas' acrylic copolymer emulsion, Acrysol ASE-95, believed to be a copolymer of ethylacrylate and methacrylic acid in emulsion form.

The pH must be raised initially to hydrolyze ethyl acrylate/methacrylic acid in order to clear up the solution. Without at least an initial pH elevation, the solution will not thicken.

DYE SELECTION

In the dye selection, since the primary use sites for Composition A will be offshore, it was decided to color the product with a bright blue colorant. Acid Blue 9 dye was utilized in the final Visclean formula.

The first formulations of Composition A were made by adding the surfactant to the d-limonene and then diluting the mixture with water. The order of addition was later changed to water then surfactant then d-limonene to facilitate manufacture. This order of addition also worked well and was used for all subsequent large scale preparations.

TABLE 3

Partial List of Surfactants Examined for Composition A

| Surfactant* | Reason for Rejection |
|---|---|
| Triton X-45 5 mole ethoxylated octylphenol from Rohm & Haas | Formed "strings' on dilution |
| Triton X-100 10 mole ethoxylated octylphenol from Rohm & Haas | Clouded on cooling |
| Triton N-101 9-10 mole etholyated nonylphenol from Rohm & Haas | Good dissolution, but clouded on cooling |
| Bio Terge PAS-85 Sodium 1-octane sulfonate from Stepan | Not soluble in d-limonene |
| A-22F Blend of surfactants from Nalco - ethoxylated nonylphenol and castor oil | Clouded on cooling |
| Aromox DM16 Dimethylhexadecylamine oxide from Akzo Chemie | Clouded on cooling |
| Tween 20 POE (20) sorbitan monolaurate from ICI | Milky on cooling |
| Tween 80 POE (20) sorbitan monooleate from ICI | Clouded on cooling |
| DDBSA Dodecylbenzene sulfonic acid from Nalco | Fumes emitted on mixing with d-limonene |
| Na DDBS Sodium dodecylbenzene sulfonate from Nalco | Clouded on cooling |

*All were used at a ratio of 1 part surfactant to 1 part d-limonene

TABLE 4

Final Formula for Composition A
A blend of the following components:

| Component Description | Weight Percent |
|---|---|
| Soft Water | 78.716 |
| 9-10 Mole Ethoxylated Nonyl Phenol | 15.000 |
| d-Limonene | 5.000 |
| Acid Blue 9 Dye | 0.004 |
| Ethyl acrylate/methacrylic acid | 1.000 |
| 50% Sodium Hydroxide | 0.180 |
| 12M Hydrochloric Acid | 0.100 |

It has been found that is these compositions, that 5-7% d-limonene is optimal and that it requires about 3 times that much or 15-21% of surfactant to clarify the composition.

We claim:

1. An aqueous cleaning composition for degreasing offshore oil rig platforms consisting of from 5-7 wt. % d-limonene, from 15-21 wt. % nonionic surfactant and from 0.2-0.4 wt. % of an acrylic copolymer thickening agent, the composition being a viscous, substantially clear solution.

2. The composition of claim 1 wherein the nonionic surfactant is a polyethoxylated alkyl phenol.

3. The composition of claim 1 wherein the nonionic surfactant is selected from the group consisting of polyethoxylated octyl phenol and polyethoxylated nonyl phenol.

4. The composition of claim 1 wherein the thickening agent is an ethyl acrylate/methacrylic acid copolymer emulsion.

5. A method of making a cleaning composition for degreasing offshore oil rig platforms, the method consisting of the steps of: providing an aqueous solution which comprises d-limonene, a nonionic surfactant and an acrylic copolymer thickening agent; adding an alkali to the aqueous solution until a viscous, substantially clear solution is formed.

6. An aqueous cleaning composition for degreasing offshore oil rig platforms consisting of from 5-7 wt. % d-limonene, from 15-21 wt. % nonionic surfactant and from 0.2-0.4 wt. % of an acrylic copolymer thickening agent, the composition being a viscous, substantially clear solution and being prepared by the method of claim 5.

7. The composition of claim 6 wherein the nonionic surfactant is a polyethoxylated alkyl phenol.

8. The composition of claim 6 wherein the nonionic surfactant is selected from the group consisting of polyethoxylated octyl phenol and polyethoxylated nonyl phenol.

9. The composition of claim 6 wherein the thickening agent is an ethyl acrylate/methacrylic acid copolymer emulsion.

* * * * *